(12) United States Patent
Ulcej et al.

(10) Patent No.: US 9,327,441 B2
(45) Date of Patent: May 3, 2016

(54) ADJUSTABLE FEEDBLOCK

(71) Applicant: Nordson Corporation, Westlake, OH (US)

(72) Inventors: John A. Ulcej, Colfax, WI (US); Michael K. Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 570 days.

(21) Appl. No.: 13/646,206

(22) Filed: Oct. 5, 2012

(65) Prior Publication Data

US 2013/0234359 A1 Sep. 12, 2013

Related U.S. Application Data

(60) Provisional application No. 61/544,126, filed on Oct. 6, 2011.

(51) Int. Cl.
| | | |
|---|---|---|
| *B29C 47/06* | (2006.01) | |
| *B29C 47/14* | (2006.01) | |
| *B29C 47/92* | (2006.01) | |
| *B29C 47/08* | (2006.01) | |

(Continued)

(52) U.S. Cl.
CPC .............. *B29C 47/92* (2013.01); *B29C 47/0019* (2013.01); *B29C 47/065* (2013.01); *B29C 47/0816* (2013.01); *B29C 47/0837* (2013.01); *B29C 47/145* (2013.01); *B29C 47/56* (2013.01); *B29C 2947/926* (2013.01); *B29C 2947/92647* (2013.01); *B29C 2947/92904* (2013.01)

(58) Field of Classification Search
CPC ............ B29C 47/0019; B29C 47/0021; B29C 47/065; B29C 47/0816; B29C 47/0837; B29C 47/145; B29C 47/56; B29C 2947/926; B29C 2947/92647; B29C 2947/92904
See application file for complete search history.

(56) References Cited

U.S. PATENT DOCUMENTS

| | | |
|---|---|---|
| 3,195,183 A | 7/1965 | Phillips |
| 3,680,997 A | 8/1972 | Dukert et al. |

(Continued)

FOREIGN PATENT DOCUMENTS

| | | |
|---|---|---|
| DE | 19757827 A1 | 6/1999 |
| DE | 202004011742 U1 | 10/2004 |

(Continued)

OTHER PUBLICATIONS

English Abstract for JP 02286217, published Nov. 26, 1990, 1 page.

(Continued)

*Primary Examiner* — James Sanders
*Assistant Examiner* — Joseph Leyson
(74) *Attorney, Agent, or Firm* — Baker & Hostetler LLP

(57) ABSTRACT

An adjustable feedblock configured for adjusting the thicknesses of each layer of the juxtaposed extrudates forming a laminate. The feedblock includes at least one pair of opposing combining planes and at least one pair of opposing extrudate distribution blocks that are removably disposed within the housing of the feedblock. As such, the combining planes and the extrudate distribution blocks partially define portions of the flow paths for the extrudates that form the laminate within the housing of the feedblock. A method for forming a laminate having juxtaposed layers of extrudates of adjustable thicknesses is also disclosed.

17 Claims, 7 Drawing Sheets

(51) Int. Cl.
*B29C 47/00* (2006.01)
*B29C 47/56* (2006.01)

(56) References Cited

U.S. PATENT DOCUMENTS

| | | | |
|---|---|---|---|
| 3,743,143 | A | 7/1973 | Barney et al. |
| 3,761,211 | A | 9/1973 | Parkinson |
| 3,792,945 | A | 2/1974 | Randall |
| 3,877,857 | A | 4/1975 | Melead |
| 4,152,387 | A | 5/1979 | Cloeren |
| 4,197,069 | A | 4/1980 | Cloeren |
| 4,344,907 | A | 8/1982 | Herrington |
| 4,439,125 | A | 3/1984 | Dieckmann et al. |
| 4,533,308 | A | 8/1985 | Cloeren |
| 4,600,550 | A * | 7/1986 | Cloren ............ 264/173.13 |
| 4,695,236 | A | 9/1987 | Predohl et al. |
| 4,780,258 | A | 10/1988 | Cloeren |
| 4,784,815 | A | 11/1988 | Cloeren et al. |
| 4,789,513 | A | 12/1988 | Cloeren |
| 4,839,131 | A | 6/1989 | Cloeren |
| 5,066,435 | A | 11/1991 | Lorenz et al. |
| 5,066,443 | A | 11/1991 | Cloeren |
| 5,147,195 | A | 9/1992 | Cloeren |
| 5,375,990 | A | 12/1994 | Krupa et al. |
| 5,971,736 | A | 10/1999 | Velluire |
| 6,017,207 | A | 1/2000 | Druschel |
| 6,287,105 | B1 | 9/2001 | Druschel et al. |
| 6,626,206 | B1 | 9/2003 | Ulcei et al. |
| 7,384,254 | B2 | 6/2008 | Rubhausen et al. |
| 7,641,462 | B2 | 1/2010 | Ito et al. |
| 7,845,927 | B2 | 12/2010 | Druschel et al. |
| 2006/0040009 | A1* | 2/2006 | Rubhausen et al. ....... 425/131.1 |
| 2008/0138598 | A1 | 6/2008 | Michel et al. |
| 2009/0194901 | A1 | 8/2009 | Nakamura |
| 2015/0104535 | A1* | 4/2015 | Truscott ............. B29C 47/0816 425/376.1 |

FOREIGN PATENT DOCUMENTS

| | | |
|---|---|---|
| EP | 0161812 A2 | 11/1985 |
| EP | 0781641 A2 | 7/1997 |
| JP | S5497663 A | 8/1979 |
| JP | 2286217 A | 11/1990 |
| JP | 5345347 A | 12/1993 |

OTHER PUBLICATIONS

English Abstract for JP 05345347, published Dec. 27, 1993, 1 page.
International Search Report and Written Opinion for PCT/US2012/059003, dated Feb. 4, 2013, 12 pages.
EDI Advances, Special K Issue, No. 20, retrieved from the Internet [http://www.extrusiondies.com/newsletter.phtml] on Jul. 10, 2015, (2010) 6 pages, Extrusion Dies Industries, LLC, Chippewa Falls, Wisconsin.
EDI Advances, Issue No. 21, (2011) 6 pages, Extrusion Dies Industries, LLC, Chippewa Falls, Wisconsin.
Nordson Extrusion Dies Industries, "Adjustable Feedblock Boosts Productivity in Coextrusion by Fine-Tuning Layer Thickness Without Need for Flow Inserts", retrieved from the Internet [http://www.extrusiondies.com/news_literature.phtml] on Jul. 10, 2015 (Oct. 27, 2010) 1 page, Extrusion Dies Industries, LLC, Chippewa Falls, Wisconsin.
International Preliminary Report on Patentability of Intl. Pat. App. No. PCT/US2012/059003 (published as WO2013052829), Sep. 13, 2013, 24 pages, International Preliminary Examining Authority, U.S. Patent and Trademark Office, Alexandria, Virginia.

* cited by examiner

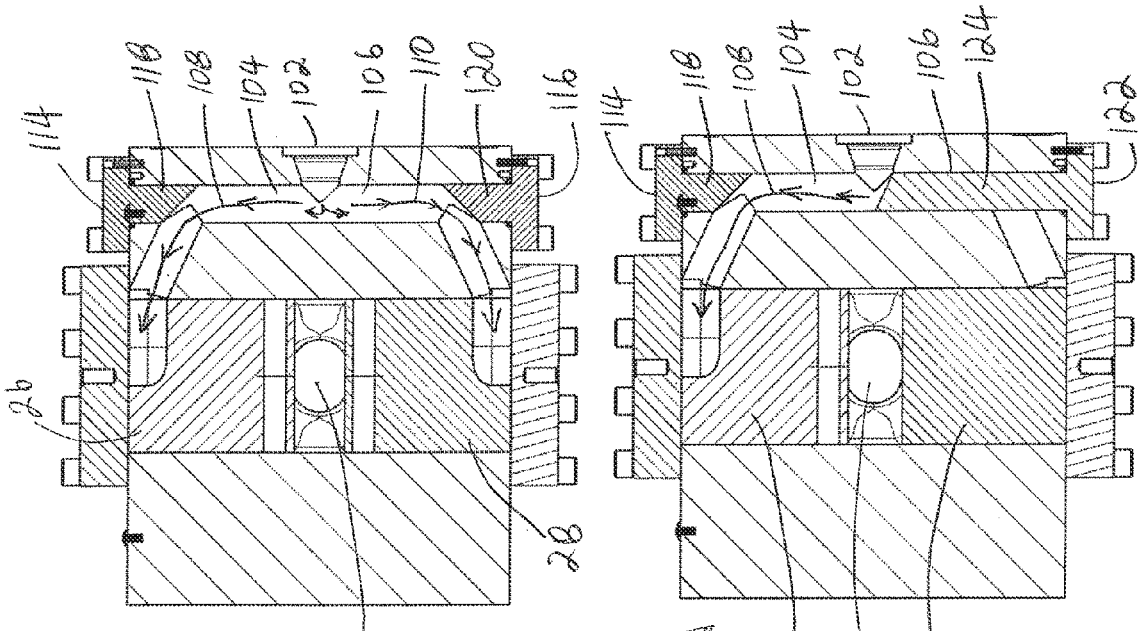
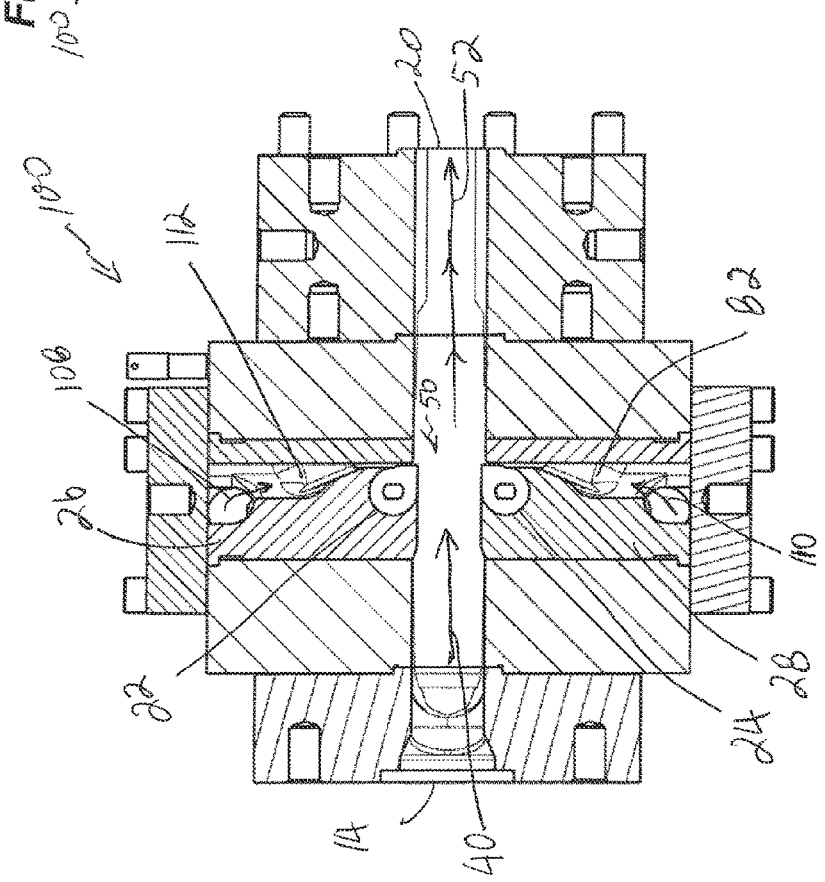
FIG. 5A
FIG. 5B
FIG. 5C

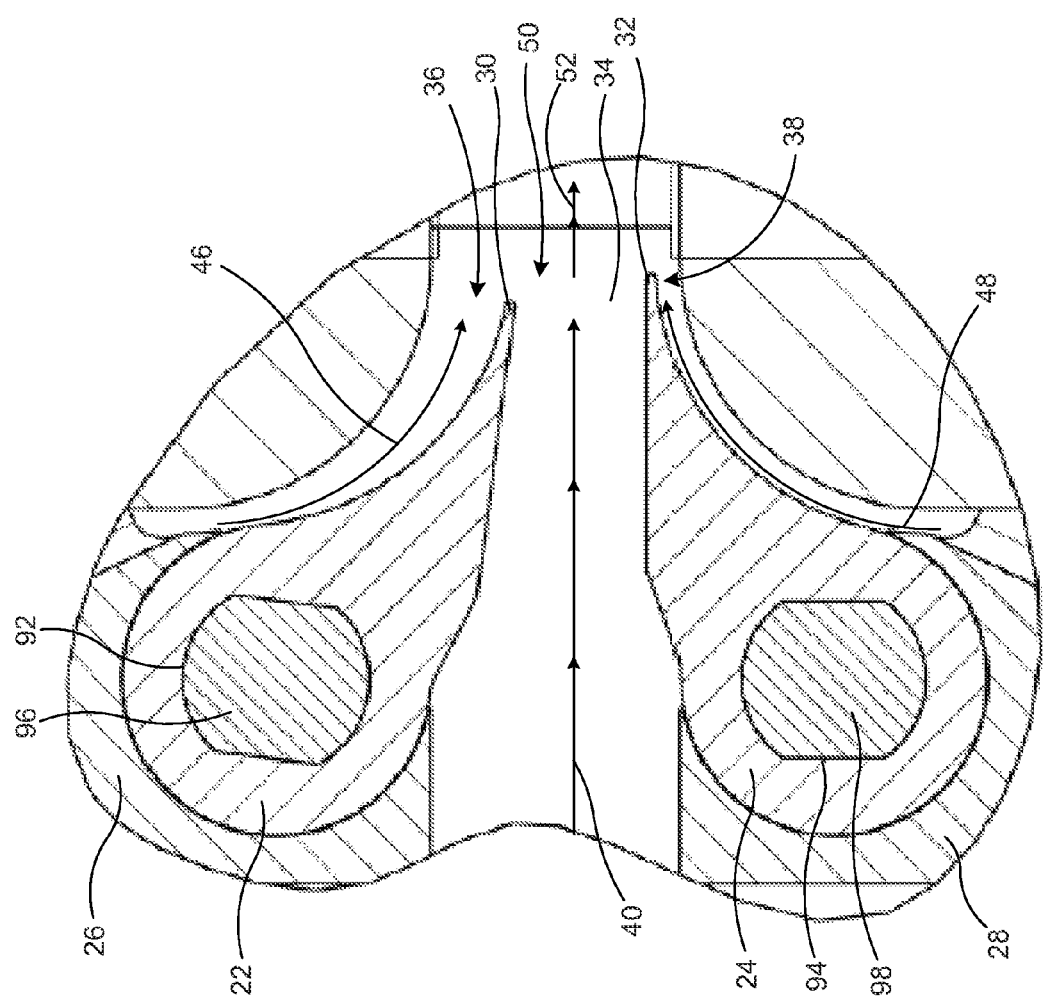

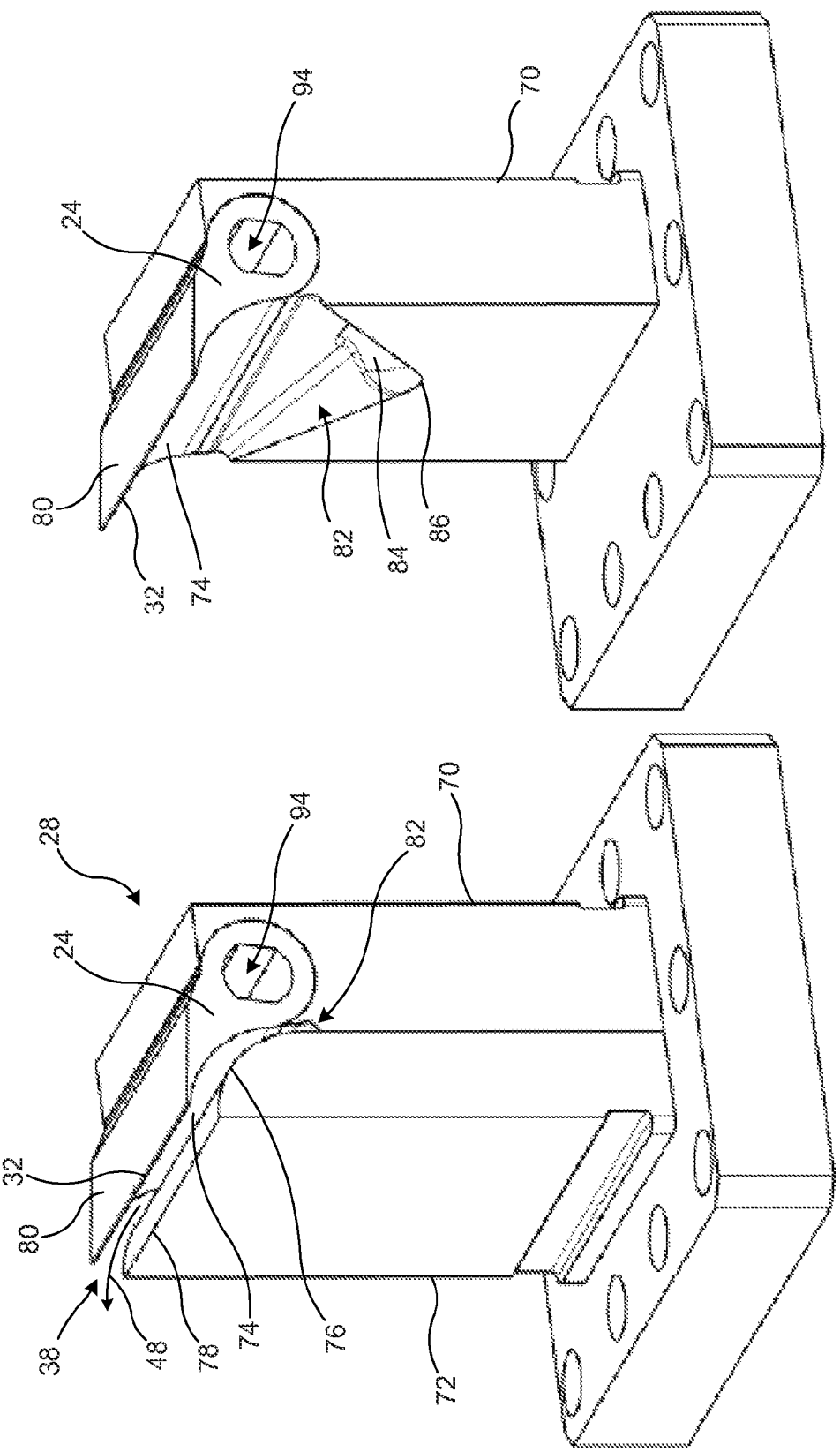

ADJUSTABLE FEEDBLOCK

CROSS-REFERENCE TO RELATED APPLICATIONS

This application claims the benefit of U.S. Provisional Patent Application Ser. No. 61/544,126 filed Oct. 6, 2011, the entirety of which is hereby incorporated herein by reference.

TECHNICAL FIELD

The present invention relates to a feedblock for forming a laminate. In particular, the invention pertains to an adjustable feedblock wherein the thicknesses of the extrudates forming the laminate can be easily adjusted.

BACKGROUND

An extrusion die for manufacturing laminates having two or more juxtaposed layers of extrudates includes a feedblock having therein a corresponding number of separate flow paths for each extrudate in the laminate. The thickness of each juxtaposed layer of the extrudate is generally a function of the flow rate of the extrudate and the size (e.g., the height) of the opening of the corresponding flow path through which the extrudate exits. Accordingly, for manufacturing laminates wherein the thicknesses of the one or more layers of the extrudates are different, it becomes necessary to dis-assemble the feedblock in order to remove and exchange dies of different sizes in order to change the size of the corresponding opening through which the extrudate exits. As will be apparent to one skilled in the art, the actual (or exact) thickness of each juxtaposed layer of the extrudate cannot be pre-determined with any degree of certainty until after the die has been re-assembled and operated. If the thickness of the one or more layer is not as expected and/or is unacceptable, then the entire process of dis-assembly, adjustment and re-assembly must be repeated. As can be appreciated, this is an expensive and time consuming proposition and prone to error. Even after the thickness of the one or more layer of extrudate has been set as desired, a change in the flow rate of an extrudate can affect the thickness of the layer of that extrudate in the laminate. For example, if the flow rate decreases, then the amount of extrudate exiting the flow path will also decrease resulting in a thinner layer of that extrudate. This may also affect the overall thickness of the laminate and/or the thickness of the layers of the other extrudates in the laminate.

Accordingly, there exists a need for an adjustable feedblock wherein the thicknesses of the layers of the one or more extrudates of a laminate can be manipulated without the necessity of dis-assembling, adjusting and re-assembling the die.

SUMMARY

A non-limiting exemplary embodiment of the instant invention is an adjustable feedblock for forming a laminate having multiple layers of extrudates. The feedblock is structurally and operationally configured for adjusting the thicknesses of each layer of the extrudates forming the laminate. The feedblock includes a housing having a primary inlet, one or more secondary inlets, and a laminate outlet. One or more combining planes and one or more extrudate distribution blocks are removably disposed within the housing. A surface of the one or more combining planes define at least a portion of a primary flow path extending between the primary inlet and a primary outlet within the housing. Additionally, the housing includes there within one or more secondary flow paths, wherein each secondary flow path extends between a secondary outlet within the housing and one or more secondary inlets and wherein at least a portion of each secondary flow path proximate the secondary outlet is defined by opposing surfaces of one of the combining planes and one of the extrudate distribution blocks. The laminate is formed at the approximate location where the primary outlet and/or the one or more secondary outlets are proximately co-located. The housing includes a laminate flow path extending between the laminate outlet and the location where the laminate is formed by juxtaposed layers of the extrudates exiting the primary outlet and/or the one or more secondary outlets. The primary outlet is at least partially defined by an edge of the one or more combining planes, and each secondary outlet is at least partially defined by an opening between the edge of one of the combining planes and an opposing edge or surface of one of the extrudate distribution blocks.

In accordance with a non-limiting exemplary embodiment of the invention, each combining plane is individually and independently adjustable. In another non-limiting example, each combining plane is configured to effectuate the thicknesses of the extrudates exiting the primary outlet and each secondary outlet. In an embodiment of the invention, each combining plane is configured for, and permitted to, operate in a free-floating mode responsive to equilibrium pressures exerted thereon by the mass flow rates of the extrudates in the primary flow path and/or in each secondary flow path. Accordingly, the equilibrium pressure exerted on each combining plane determines the thickness of the extrudate exiting the primary outlet and the secondary outlet defined, at least partially, by the combining plane. As such, the thicknesses of the extrudates exiting the primary outlet and each one of the one or more secondary outlets can be effectuated by modulating the mass flow rates of the extrudates in the primary flow path and in each one of the one or more secondary flow paths. In another embodiment of the invention, the extent (or sensitivity) of the responsiveness of each combining plane to the equilibrium pressures exerted thereon is adjustable. In yet another embodiment of the invention, each combining plane can be set in a pre-determined position. Accordingly, the feedblock can be used for forming a multi-layer laminate, and also for extruding a single layer of the extrudate flowing through any one the primary and/or secondary flow paths. In certain embodiments of the invention, the extrudate feedblock includes a concave shaped surface at least partially defining a concave-shaped flow path section in at least a portion of the secondary flow path.

A method for forming a laminate, in accordance with a non-limiting exemplary embodiment of the instant invention, includes providing an adjustable feedblock according to embodiments of the invention, introducing extrudates into the primary inlet and into at least one secondary inlet of the adjustable feedblock. The laminate is formed within the housing of the feedblock and is extruded through the laminate outlet in the housing of the feedblock.

BRIEF DESCRIPTION OF THE DRAWINGS

FIG. 5A is a side cross-sectional view of another embodiment of an adjustable feedblock;

FIG. 5B is a side cross-sectional view of the feedblock of FIG. 5A with one secondary inlet in fluid communication with two secondary flow paths;

FIG. 5C is a side cross-sectional view of the feedblock of FIG. 5B with one of the two secondary flow paths blocked;

FIG. 6A is a partial cross-sectional view of a portion of an opposed pair of extrudate distribution blocks illustrating an alternate embodiment of keyed openings in an opposed pair of combining planes;

FIG. 6B is a perspective view of an extrudate distribution block illustrating a combining plane with the keyed openings of FIG. 6A; and FIG. 6C is a perspective view illustrating a portion of an extrudate flow path within the extrudate distribution block of FIG. 6B.

DETAILED DESCRIPTION

While multiple embodiments of the instant invention are disclosed, alternate embodiments may become apparent to those skilled in the art. The following describes only exemplary embodiments of the invention with reference to the accompanying drawings wherein like elements are designated by like numerals. It should be clearly understood that there is no intent, implied or otherwise, to limit the invention in any form or manner to that described herein. As such, all alternatives are considered as falling within the metes and bounds of the instant invention.

Figure 1:
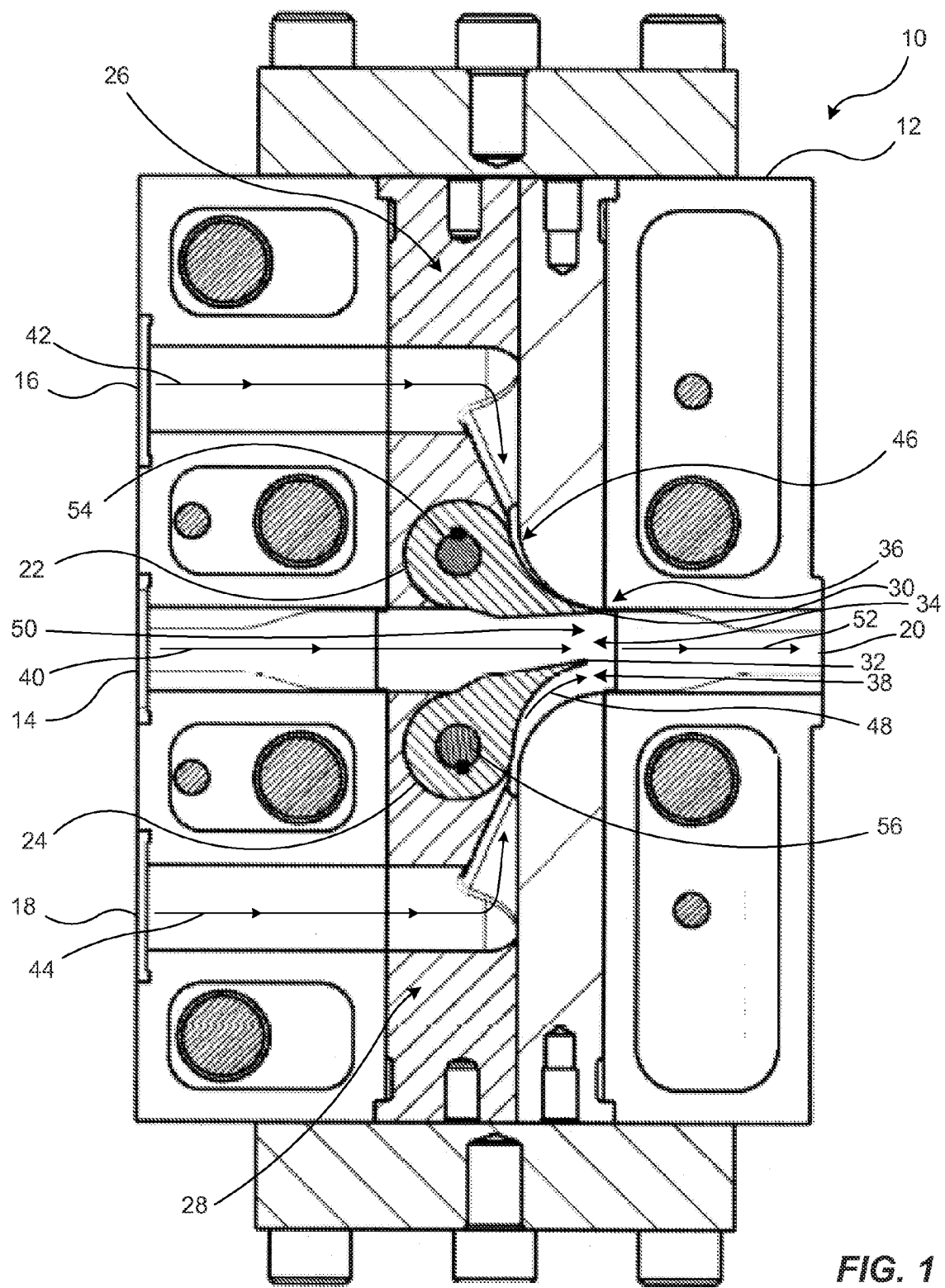
FIG. 1 is a cross-sectional view of an adjustable feedblock in accordance with an embodiment of the invention.

FIG. 1 is a cross-sectional view of adjustable feedblock 10 in accordance with a non-limiting exemplary embodiment of the invention. Housing 12 of feedblock 10 includes primary inlet 14 and two secondary inlets 16 and 18 through which extrudates are introduced into feedblock 10. A laminate, formed within housing 12, is extruded through laminate outlet 20. Feedblock 10 further includes at least one pair of opposing combining planes 22 and 24 that are removably disposed within housing 12. Also removably disposed within housing 12 of feedblock 10 is at least one pair of extrudate distribution blocks 26 and 28. In an embodiment of the invention, an opening between opposing edges 30 and 32 of the pair of combining planes 22 and 24, respectively, at least partially defines primary outlet 34 within housing 12 of feedblock 10. Additionally, at least two openings, each between one of opposing edges 30 and 32 and a surface of extrudate distribution blocks 26 and 28, at least partially defines at least two secondary outlets 36 and 38 within housing 12 of feedblock 10. In the non-limiting exemplary embodiment illustrated in FIG. 1, secondary outlet 36 is shown in a closed position and secondary outlet 38 is shown in a partially open position.

Within housing 12, feedblock 10 includes primary flow path 40 extending between primary inlet 14 and primary outlet 34. In the illustrated embodiment of the invention, at least a portion of primary flow path 40 in proximity of primary outlet 34 is defined by opposing surfaces of the pair of combining planes 22 and 24. Additionally, housing 12 is illustrated having two secondary flow paths 42 and 44, wherein each secondary flow path 42/44 extends between respective secondary inlet 16/18 and corresponding secondary outlet 36/38. As is apparent, the embodiment illustrated in FIG. 1 includes two secondary inlets 16 and 18 in fluid communication with respective secondary flow paths 42 and 44 extending between secondary inlets 16 and 18 and secondary outlets 36 and 38, respectively. It should be understood that it is not a necessity that each secondary flow path include a correspondingly dedicated secondary inlet. In some embodiments of adjustable feedblock 10, housing 12 may include a unitary or a single secondary inlet for introducing the extrudate into each secondary flow path 42 and 44. In the illustrated embodiment of the invention, at least a portion of each secondary flow path 42/44 in the proximity of secondary outlet 36/38 is defined by a surface of extrudate distribution block 26/28 and a surface of combining plane 22/24. For example, as shown in FIG. 1, portions 46 and 48 of secondary flow paths 42 and 44 are respectively defined between the surfaces of extrudate distribution block 26 and 28 and the surfaces of combining planes 22 and 24. This is further described herein below with reference to FIGS. 3 and 4.

While the embodiment of housing 12, as described herein with reference to FIG. 1, includes two secondary inlets 16 and 18, two secondary flow paths 42 and 44, one pair of opposing combining planes 22 and 24, and one pair of extrudate distribution blocks 26 and 28, the instant invention is not to be construed as being limited by the number or quantity of each one of these components and/or their configurations and/or arrangements. Accordingly, alternate embodiments of adjustable feedblock 10 can include less than two or more than two of any one of secondary inlet, secondary flow path, combining plane, and distribution block. For instance, in a non-limiting exemplary embodiment, adjustable feedblock 10 can include one secondary inlet, a pair of opposing combining planes, and a pair of extrudate distribution blocks, wherein the one secondary inlet is in fluid communication with each one of the two secondary flow paths extending between the two previously described secondary outlets and the one secondary inlet. In another non-limiting exemplary embodiment, adjustable feedblock 10 can include one secondary inlet, one secondary flow path, one combining plane, and one extrudate distribution block, wherein the primary outlet is at least partially defined by a portion of the one combining plane, and the opening between opposing edges and/or surfaces of the one combining plane and the one distribution block at least partially define one secondary outlet, and the one secondary flow path extends between the one secondary inlet and the one secondary outlet. As will be apparent to one skilled in the art, numerous combinations and/or arrangements of these components of adjustable feedblock 10 are conceivable. Accordingly, all variants of the described and/or illustrated embodiments are considered as being within the metes and bounds of the instant invention.

However, for the purposes of describing an embodiment of the invention, the following often references two secondary inlets, two secondary flow paths, two secondary outlets, an opposed pair of combining planes, an opposed pair of extrudate distributions blocks, etc. As stated, the number or quantity of each one of these components and/or their configurations and/or arrangements should not be construed as imposing any limitations on the described and/or illustrated embodiments.

In the non-limiting exemplary embodiment shown in FIG. 1, reference numeral 50 identifies an approximate location within housing 12 where primary outlet 34 and secondary outlets 36 and 38 are proximately co-located. As such, reference numeral 50 identifies an approximate location within housing 12 where extrudates exiting primary outlet 34 and each one of secondary outlets 36 and 38 are juxtaposed to form a laminate. The laminate so formed flows along flow path 52 and is extruded through laminate outlet 20 in housing 12 of feedblock 10.

In accordance with an embodiment of the invention, each combining plane 22 and 24 is individually and independently adjustable to effectuate the extents of each opening defining primary outlet 34 and each one of secondary outlets 36 and 38. As will be apparent to one skilled in the art, movements of combining planes 22 and 24 will therefore also effectuate the thicknesses of extrudates exiting primary outlet 34 and each one of secondary outlets 36 and 38.

In an embodiment of the invention, each combining plane 22 and 24 is configured for operating in a free-floating mode such that either one or both combining planes 22 and 24 will move in response to an equilibrium pressure exerted on each combining plane 22 and 24 by the mass flow rates of the extrudates in primary flow path 40 and in each secondary flow path 42 and 44. As will be apparent to one skilled in the art, a change in the mass flow rate of extrudate in any one or more of primary flow path 40 and secondary flow paths 42 and 44 will change the pressures exerted on both combining planes 22 and 24 by the extrudates flowing in each one of primary flow path 40 and secondary flow paths 42 and 44. For example, an increase in the mass flow rate of extrudate in primary flow path 40, with no change in the mass flow rates of extrudates in both secondary flow paths 42 and 44, will increase the pressure exerted on both combining planes 22 and 24 by the extrudate in primary flow path 40. As such, the equilibrium pressures exerted on each combining plane 22 and 24 will also change. In accordance with this example, this change in the equilibrium pressures will both increase the opening defining primary outlet 34 and decrease both openings defining secondary outlets 36 and 38. As a result, the thickness of the extrudate exiting primary outlet 34 will increase while the thicknesses of the extrudates exiting each secondary outlet 36 and 38 will decrease. Accordingly, when each combining plane 22 and 24 is operating in a free-floating mode, a change in the mass flow rates of extrudates in any one or more of primary flow path 40 and secondary flow paths 42 and 44 will effectuate the thicknesses of the extrudates exiting primary outlet 34 and each secondary outlet 36 and 38 because a change in any one or the mass flow rates will also change the equilibrium pressure exerted on each combining plane 22 and 24 which, in turn, will effectuate the openings defining primary outlet 34 and each one of secondary outlets 36 and 38.

In an embodiment of the invention, each combining plane 22 and 24 respectively include keyed openings 54 and 56, or similar configurations, for receiving a shaft or an extension of an adjustment mechanism for individually and independently operating and/or manipulating the responsiveness of each combining plane 22 and 24 to the equilibrium pressures exerted thereon, as described in the foregoing. In an alternate embodiment of the invention, the shaft of the adjustment mechanisms received in keyed openings 54 and 56 are configured for individually and independently setting each combining plane 22 and 24 to a pre-determined position reflective of the desired thicknesses of the extrudates exiting primary outlet 34 and each secondary outlet 36 and 38 and forming the laminate.

Figure 2:
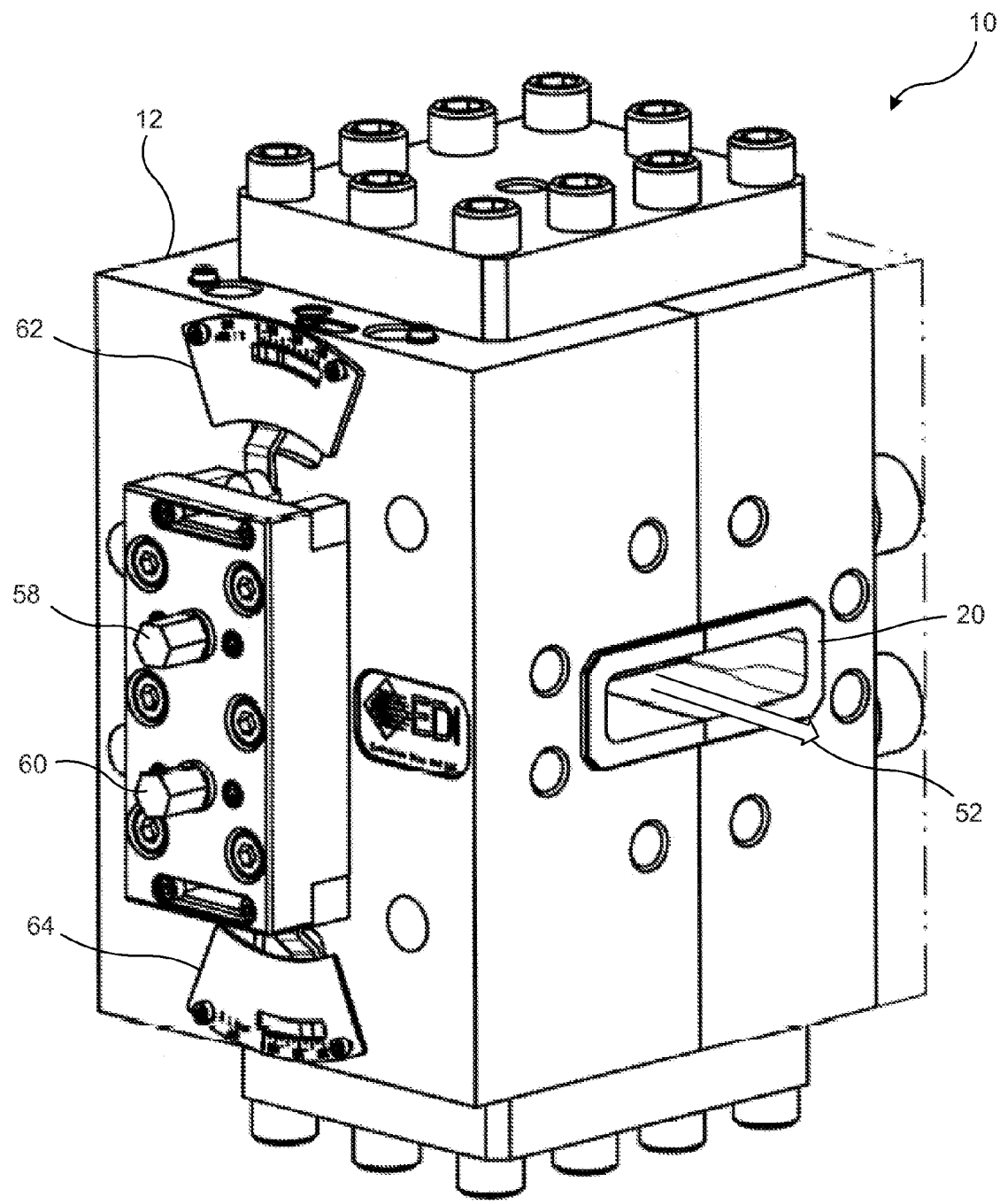
FIG. 2 is a perspective view of the adjustable feedblock of FIG. 1.

FIG. 2 is an external perspective view of the non-limiting exemplary embodiment of feedblock 10 shown in FIG. 1. Feedblock 10 includes adjustment mechanisms 58 and 60 extending into housing 12. In accordance with an embodiment of the invention, adjustment mechanisms 58 and 60 respectively include an extension, e.g., a shaft, which is compatible with and received in keyed openings 54 and 56 such that the shaft of each adjustment mechanism 58 and 60 can be individually and independently extended into respective keyed openings 54 and 56, and thereafter rotated clockwise or counter-clockwise for correspondingly moving combining planes 22 and 24 and thereby changing the openings defining primary outlet 34 and each secondary outlet 36 and 38. While adjustment mechanisms 58 and 60 are described as having rotational functions, alternate embodiments, such as translational movements, for effectuating movement of combining planes 22 and 24 for changing the openings defining primary outlet 34 and each secondary outlet 36 and 38, either individually or in combination, are considered as falling within the metes and bounds of the instant invention.

As illustrated in FIG. 2, each adjustment mechanism 58 and 60 includes a corresponding gauge 62 and 64, or a similar mechanism, configured for indicating the position of each combining plane 22 and 24. In an alternate embodiment of the invention, each gauge 62 and 64 is configured for indicating the extent of the openings defining each secondary outlet 36 and 38 from which an indication of the extent of the opening defining primary outlet 34 can be deduced. In another embodiment of the invention, each gauge 62 and 64 is configured for indicating both the positions of the corresponding combining planes 22 and 24 and the extent of the openings defining each secondary outlet 36 and 38. All alternative embodiments for gauges 62 and 64 are considered as falling within the metes and bounds of the instant invention.

In an embodiment of the invention, each combining plane 22 and 24 is configured for operating in a free-floating mode. In one such embodiment, the extent to which each combining plane 22 and 24 responds to the equilibrium pressure exerted there onto is adjustable. In other words, when operating in a free-floating mode, the extent (or sensitivity) of the responsiveness of each combining plane 22 and 24 to the equilibrium pressures (i.e., the mass flow rates of the extrudates) can be changed. For example, during certain processes with fluctuating mass flow rates of extrudates the equilibrium pressures exerted on each combining plane 22 and 24 will also fluctuate. Accordingly, it may be desirable to restrict (or dampen) the extent to which one or both combining planes 22 and 24 respond to the equilibrium pressures exerted thereon so that there is less or no effect of the fluctuation in the one or more mass flow rates (and pressures) on the thicknesses of the extrudates exiting primary outlet 34 and each secondary outlet 36 and 38. To that end, in some embodiments of the invention, feedblock 10 includes a counter-acting spring or other mechanism (not shown) which can be manipulated to adjust the extent (or sensitivity) of the responsiveness of each combining plane 22 and 24 to the equilibrium pressures exerted thereon. As will be apparent to one skilled in the art, each combining plane 22 and 24 and/or each adjustment mechanism 58 and 60 can be configured for incorporating such a sensitivity adjustment mechanism.

In an alternate embodiment of the invention, feedblock 10 is configured such that the position of each combining plane 22 and 24 is individually and independently set to a pre-determined position and, therefore, not responsive to any change in the equilibrium pressures exerted thereon. Accordingly, the thicknesses of the extrudates exiting primary outlet 34 and one or both secondary outlet 36 and 38 is set at a pre-determined value.

In view of the foregoing disclosure describing non-limiting exemplary embodiments of the instant invention, it will be apparent to one skilled in the art that while feedblock 10 is configured for forming a three-layer laminate at the approximate location identified by reference numeral 50, it can just as well be used for forming a two-layer laminate at that same location 50. For instance, when combining planes 22 and 24 are operating in a free-floating mode, the flow of extrudate in any one of primary flow path 40 and secondary flow paths 42 and 44 can be stopped, which, in turn, will result in the closure of the corresponding outlet. For example, referring back to FIG. 1, it will be apparent to one skilled in the art that termination of flow in secondary flow path 42 will cause closure of secondary outlet 36 in response to the equilibrium pressures exerted on combining planes 22 and 24, respectively, by the mass flow rates of the extrudates in primary flow path 40 and in secondary flow path 44. In accordance with this example, the thicknesses of the extrudates exiting primary outlet 34 and secondary outlet 38 will be effectuated by the mass flow rates of the extrudates in primary flow path 40 and in secondary flow path 44. Similarly, termination of flow in primary flow path 40 will result in a closure of primary outlet 34, and the thicknesses of the extrudates exiting each secondary outlet 36 and 38 will be effectuated by the mass flow rates of the extrudates in each secondary flow path 42 and 44. Of course, as disclosed and described in the foregoing, the extent (or sensitivity) of the responsiveness of one or both combining planes 22 and 24 can be adjusted. Furthermore, the thicknesses of the extrudates exiting any one of primary outlet 34 and secondary outlets 36 and 38 can be set to pre-determined values by appropriately setting the position of one or both combining planes 22 and 24. As such, adjustments or changes in the thicknesses of each layer forming the laminate can be made without the need to stop operation of the die for disassembling and re-assembling the feedblock. As will be apparent to one skilled in the art, feedblock 10 can also be used for extruding a single layer of any one of the extrudates flowing in any one of primary flow path 40 and secondary flow paths 42 and 44.

In the non-limiting exemplary embodiment of feedblock 10 disclosed and described in the foregoing with reference to FIGS. 1 and 2, extrudate distribution blocks 26 and 28 are positioned in opposing relationship within housing 12. As shown, extrudate distribution blocks 26 and 28 are essentially identical, although that is not required. In the following, the configuration of only one extrusion distribution block, viz., extrudate distribution block 28, is described with reference to FIGS. 3 and 4.

Figure 3:
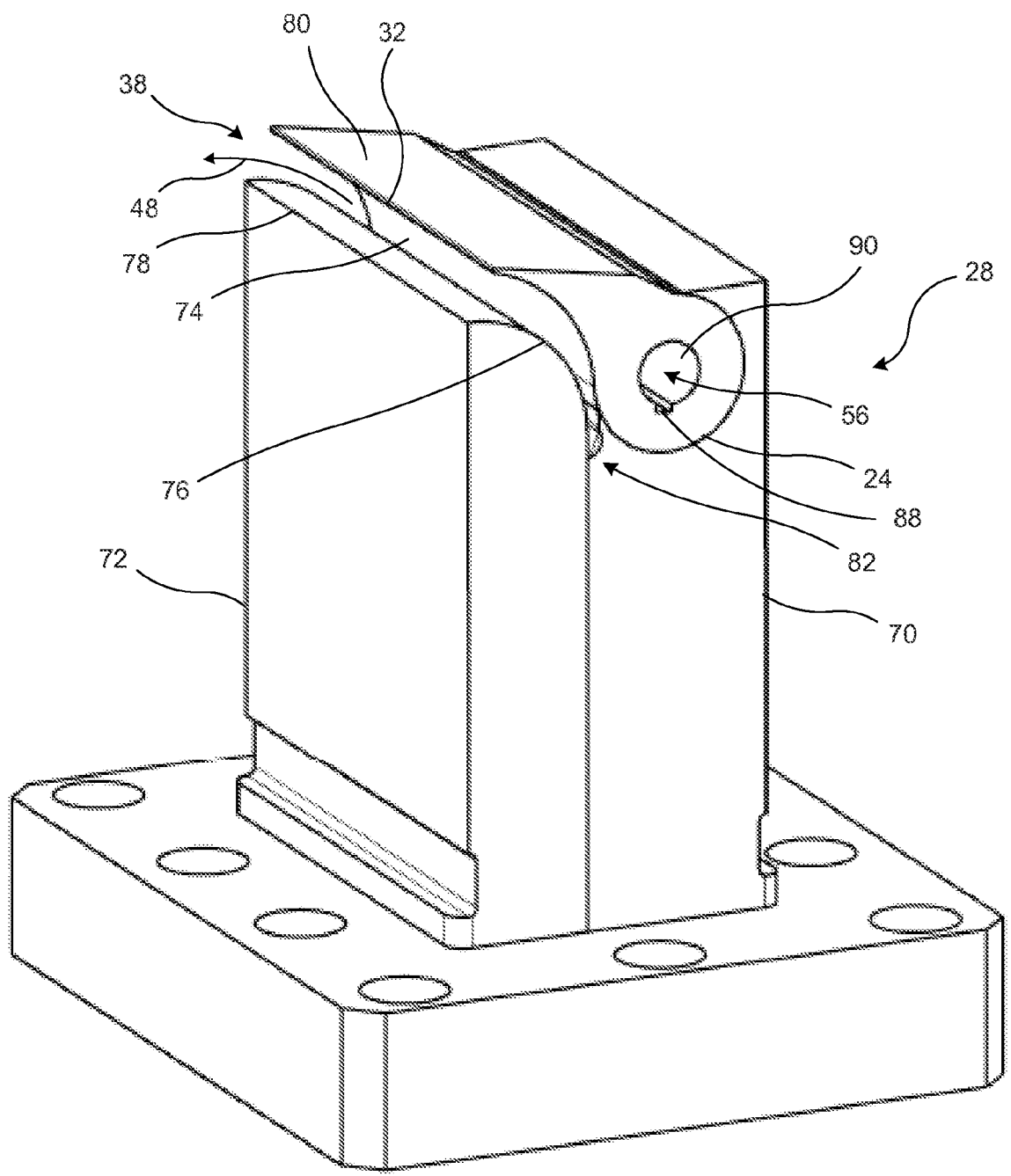
FIG. 3 is a perspective view of an extrudate distribution block within the adjustable feedblock of FIG. 1.

FIG. 3 is a perspective view of extrudate distribution block 28 including combining plane 24 in accordance with a non-limiting exemplary embodiment of the instant invention. As illustrated, extrudate distribution block 28 includes extrudate inlet block 70 abutting block 72. Extrudate inlet block 70 is configured for accommodating removable combining plane 24 such that contoured surface 74 of combining plane 24 is adjustable between a spaced-apart opposed relationship with contoured surface 76 of block 72 and a closed position. As illustrated, secondary outlet 38 is defined by an opening between edge 32 of combining plane 24 and edge 78 (or at least a portion of contoured surface 76 in close proximity of edge 78) of block 72. As will be apparent to one skilled in the art, and in view of the foregoing description with reference to FIGS. 1 and 2, a rotational movement of combining plane 24 between an open and a closed position will change the size of the opening defining secondary outlet 38. As illustrated, a clockwise rotation of combining plane 24 will increase the size of the opening defining secondary outlet 38 and a counter-clockwise rotation of combining plane 24 will decrease the size of the opening defining secondary outlet 38. As previously described, such movement of combining plane 24 will effectuate not only the thickness of the extrudate exiting secondary outlet 38, but will also effectuate the thicknesses of the extrudates exiting primary outlet 34 and secondary outlet 36.

As described in the foregoing with reference to FIG. 1, at least a portion of primary flow path 40 in proximity of primary outlet 34 is defined by opposing surfaces of the pair of combining planes 22 and 24. As illustrated in FIG. 3, surface 80 of combining plane 24 and a correspondingly opposed surface of combining plane 22 define the indicated portion of primary flow path 40 in proximity of primary outlet 34.

Although not shown in FIG. 3, extrudate inlet block 70 includes an inlet and also includes flow path section 82 therewithin. Referring back to FIG. 1, it is seen that extrudate introduced into secondary inlet 18 of feedblock 10 flows along secondary flow path 44 within housing 12, and thereafter enters into and flows within extrudate distribution block 28. As described herein below with reference to FIG. 4, extrudate inlet block 70 includes flow path section 82, illustrated here as V-shaped, on at least a portion of the surface of extrudate inlet block 70 opposite a surface of abutting block 72. In other embodiments of the invention, flow path section 82 is of a shape or configuration different from the V-shape shown in FIG. 4. Accordingly, in a non-limiting exemplary embodiment of extrudate distribution block 28, flow path section 82 can be U-shaped. As described herein below with reference to FIG. 4, it should be understood that the extrudate path of travel along flow path section 82 can be one of or a combination of more than one shape.

Figure 4:
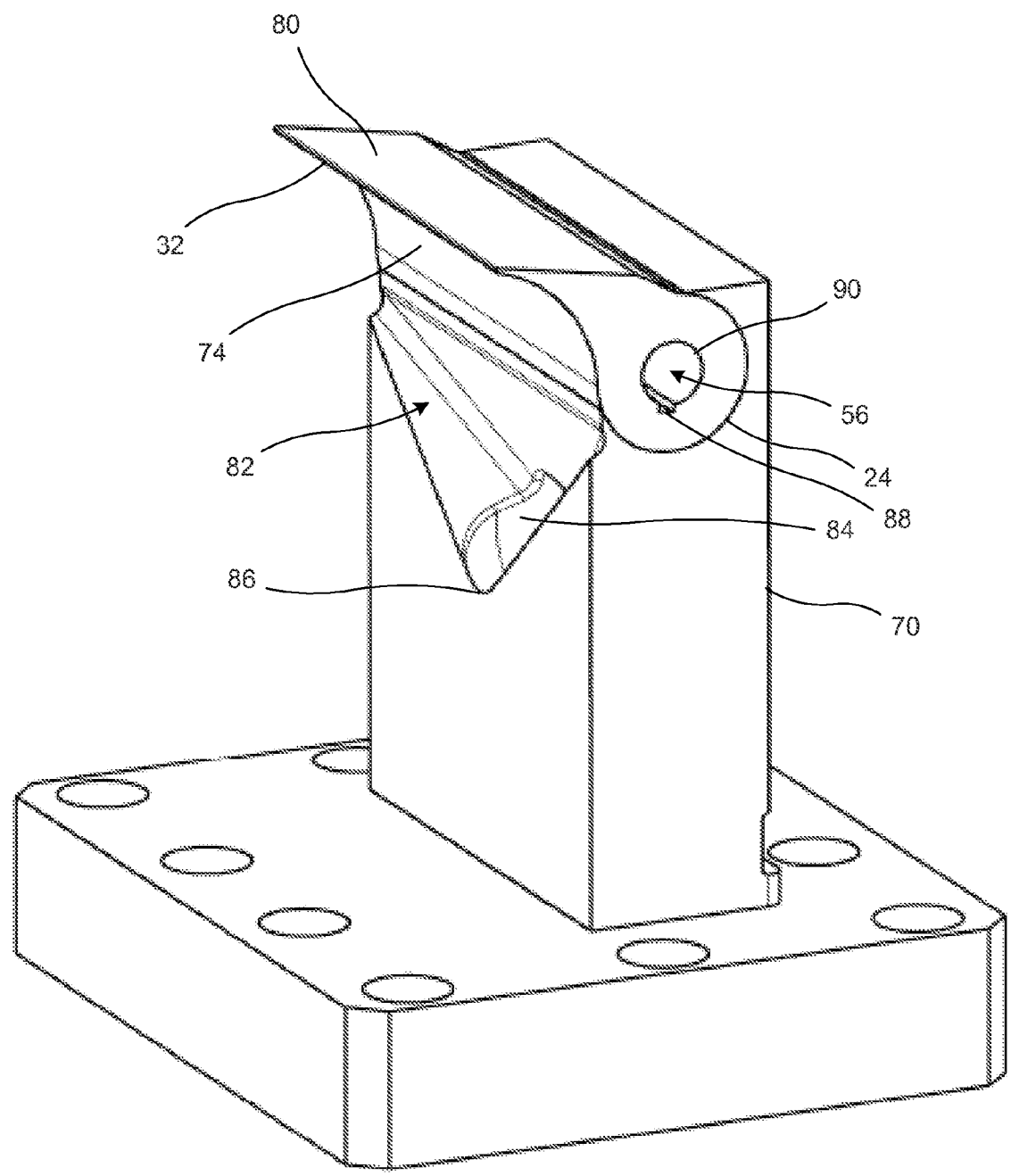
FIG. 4 is a perspective view illustrating a portion of an extrudate flow path within the extrudate distribution block of FIG. 3.

FIG. 4 is a perspective view of extrudate inlet block 70 illustrating V-shaped flow path section 82 in accordance with a non-limiting exemplary embodiment of the invention. The extrudate flowing along flow path 44 enters extrudate inlet block 70 and exits flow path 44 at outlet 84 in extrudate inlet block 70. While outlet 84 in extrudate inlet block 70 is illustrated having a circular cross-section, other embodiments may include outlet 84 having a cross-section of any geometric shape, including a square, a rectangular, a triangular, a parallelogram, etc. For instance, in a non-limiting embodiment of extrudate distribution block 28, outlet 84 in extrudate inlet block 70 can be rectangular, for example a slot, extending longitudinally between opposed sides of extrudate inlet block 70. The slot can be substantially orthogonal to the sides between which it extends, or it can be at an angle relative the sides between which extends. It should be apparent that while a unitary or a single outlet 84 is illustrated, alternate embodiments of extrudate distribution block 28 can include more than one outlet 84 in extrudate inlet block 70. For instance, a non-limiting exemplary embodiment of extrudate distribution block 28 can have two (or more) outlets 84 in extrudate inlet block 70 forming a W-shaped flow path section 82. Alternatively, outlet 84 can be configured as a manifold in extrudate inlet block 70. Accordingly, all variants of the described and/or illustrated embodiments are considered as being within the metes and bounds of the instant invention.

As illustrated, apex 86 of flow path section 82 is located at outlet 84 and in proximity of, and in fluid communication with, secondary inlet 18. As will be apparent to one skilled in the art, with block 72 in place abutting extrudate inlet block 70, the extrudate exiting outlet 84 will flow along flow path section 82 and thereafter exit through secondary outlet 38 of extrudate distribution block 28 as a sheet of extrudate. It should be understood that upon exiting outlet 84, the extrudate path of travel along flow path section 82 can be one of, or a combination of, more than one shape. For instance, in a non-limiting embodiment of extrudate distribution block 28, the path of travel from outlet 84 in extrudate inlet block 70 to secondary outlet 38, in other words the path of extrudate travel along flow path section 82, can be linear or curvilinear or any alternate shape or any combination thereof. Accordingly, in a non-limiting exemplary embodiment of extrudate distribution block 28, the path traveled by the extrudate after exiting outlet 84 in extrudate inlet block 70 is concave. In certain embodiments of extrudate distribution block 28, the shape of the path of extrudate travel is at least partially defined by extrudate inlet block 70 or abutting opposed block 72 or both.

Referring back to FIGS. 1-4, primary inlet 14 and secondary inlets 16 and 18 are illustrated as being located on the same side or wall of housing 12 opposite the side or wall of housing 12 on which laminate outlet 20 is located. Also, primary flow path 40 extending between primary inlet 14 and primary outlet 34 is illustrated as being substantially straight. Similarly, at least some portions of secondary flow paths 42 and 44 extending from their respective secondary inlets 16 and 18 through at least a portion of their respective extrudate distribution blocks 26 and 28 are illustrated as being substantially straight. However, as will be apparent to one skilled in the art, such locations for the inlets and such linear configurations of the flow path are not strictly required. In a non-limiting exemplary embodiment, one or both secondary inlets 16 and 18 are located on one or more walls or sides of feedblock 12 other than the walls or sides on which primary inlet 14 and laminate outlet 20 are located. For instance, if the wall or side of feedblock 12 on which primary inlet 14 is located is considered to be a "back wall" and the wall or side of feedblock 12 on which laminate outlet 20 is located is considered to be a "front wall", then one or both secondary inlets 16 and 18 can be located on either one of the two "side walls" or on both "side walls" extending between the "front wall" and the "back wall" of feedblock 12. In a non-limiting exemplary embodiment, both secondary inlets 16 and 18 are located on the same "side wall". Alternatively, secondary inlets 16 and 18 are located on opposite "side walls" of feedblock 12. In certain embodiments, one of the two secondary inlets 16 and 18 is located on the same "back wall" as primary inlet 14 and the other secondary inlet is located on one of the two "side walls" of feedblock 12. In another embodiment, primary inlet 14 is located on one of the two "side walls" and either one or both secondary inlets 16 and 18 are located on the "back wall" and/or on one or both "side walls" of feedblock 12. In view thereof; it will be apparent to one skilled in the art that one or more of primary inlet 14 and secondary inlets 16 and 18 can be located on any wall of feedblock 12. It should be also apparent that other embodiments can include one or more of primary inlet 14 and secondary inlets 16 and 18 on the "top wall" and/or on the "bottom wall" of feedblock 12. Still further alternative locations for one or more of primary inlet 14 and secondary inlets 16 and 18 will become apparent to one skilled in the art. All variants of the described and/or illustrated embodiments are considered as being within the metes and bounds of the invention.

Additionally, there is no requirement that each secondary flow path have a corresponding and dedicated secondary inlet. Some embodiments of adjustable feedblock 10 may include one secondary inlet in fluid communication with one or more secondary flow paths. Other embodiments of adjustable feedblock 10 may include one or more secondary inlets in fluid communication with one secondary flow path. Certain embodiments of adjustable feedblock 10 may include one or more secondary inlets in fluid communication with one or more secondary flow paths. One such embodiment has been described in the foregoing with reference to FIG. 1. As can be seen, several combinations and arrangements for the extrudate inlets and/or the extrudate flow paths in the primary and/or the secondary flow paths are possible as alternate embodiments. All such variants of the described and/or illustrated embodiments are considered as being within the metes and bounds of the instant invention.

In view of the foregoing, it will be apparent to one skilled in the art that one or more of primary flow path 40 and secondary flow paths 42 and 44 do not always have to be straight flow paths. Also, the flow paths do not have to be substantially horizontal as illustrated. For instance, in a non-limiting exemplary embodiment one or more of primary flow path 40 and secondary flow paths 42 and 44 twist and turn as they extend between their respective inlets and outlets. In other embodiments, the one or more flow paths can be angled relative to one another and/or angled relative to one or more of laminate outlet 20, laminate flow path 52, location 50 within housing 12 where primary outlet 34 and secondary outlets 36 and 38 are proximately co-located, etc. It will be apparent to one skilled in the art that it is desirable to minimize the resistance to the flow of the extrudates in the one or more flow paths. As such, further alternate embodiments will become apparent to one skilled in the art. All such embodiments are considered as being within the metes and bounds of the instant invention.

FIGS. 5A-5C illustrate a non-limiting exemplary embodiment of feedblock 100 having a unitary or a single secondary inlet 102 on a side of feedblock 100 different from the side having primary inlet 14. FIG. 5A shows secondary inlet 102 in fluid communication with two secondary flow paths 106 and 106 extending between their respective secondary outlets and secondary inlet 102. The extrudate entering secondary inlet 102 is directed into extrudate distributions blocks 26 and 28 wherein it flows along secondary flow paths 104 and 106 in the direction indicated by arrows 108 and 110, respectively. As illustrated in FIG. 5B, within extrudate distribution blocks 26 and 28, the extrudate in secondary flow paths 104 and 106 flows through flow path sections 112 and 82 in respective extrudate distribution blocks 26 and 28. The extrudate exits extrudate distribution blocks 26 and 28 at respective secondary outlets 36 and 38 and is juxtaposed with the extrudate entering primary inlet 14 and flowing along primary flow path 40. The laminate thus formed proximate the location identified by numeral 50 flows along laminate flow path 52 and exits feedblock 100 at laminate outlet 20.

In accordance with a non-limiting exemplary embodiment of the invention, feedblock 100 is configured for enabling or disabling the flow of the extrudate in secondary flow paths 104 and 106. As illustrated in FIG. 5A, feedblock 100 includes plugs 114 and 116 having respective stems 118 and 120 which at least partially extend into at least a portion of secondary flow paths 104 and 106. As shown, stems 118 and 120 are "short" and configured to not hinder or block the flow of extrudate in secondary flow paths 104 and 106. Accordingly, the flow of extrudate in either one (or both) secondary flow paths 104 and 106 can be blocked by placing an obstruction therein. Referring now to FIG. 5C, it is seen that the flow of extrudate in secondary flow path 106 is blocked by replacing plug 116 (having short stem 120) with plug 122 having "long" stem 124. It should be apparent that stem 124 of plug 122 must be configured for a snug or tight fit within secondary flow path 106. While FIG. 5C shows plug 122 obstructing the flow of the extrudate in secondary flow path 106, it should be readily apparent that plug 122 can be similarly used for obstructing or blocking the flow of extrudate in secondary flow path 104, instead of that in secondary flow path 106. Alternate configurations or methods for obstructing or blocking the flow of extrudate in secondary flow paths 104 and 106 will become apparent to one skilled in the art. All such variants of the described and/or illustrated embodiments are considered as being within the metes and bounds of the instant invention.

Turning now to FIGS. 3 and 4, keyed opening 56 of combining plane 24 is illustrated as having a substantially circular cross-section with longitudinally extending groove or slot or indentation 88 on at least a portion of inside surface 90 of keyed opening 56. In some embodiments of the invention, groove 88 extends at least a portion of the longitudinal extent of keyed opening 56. In other embodiments of the invention, groove 88 extends the entire longitudinal extent (or length) of keyed opening 56. As previously described, some embodiments of the invention include an adjustment mechanism having a shaft or an extension configured for individually and independently operating the corresponding combining plane and/or for manipulating the responsiveness of the corresponding combining plane to the equilibrium pressures exerted thereon. Accordingly, it will be apparent to one skilled in the art that at least the outside surface of the shaft of the corresponding adjustment mechanism 60 should be substantially similar to or match inside surface 90 of keyed opening 56 within which it is received. As such, at least a portion of the outside surface of the shaft of adjustment mechanism 60 will include a mating protrusion matching, and configured for being received within, groove or slot or indentation 88 on inside surface 90 of keyed opening 56.

In view of the foregoing, it will be apparent to one skilled in the art that at least the cross-sectional geometry or shape of keyed opening 56 and that of the shaft of adjustment mechanism 60 can be different from that illustrated in FIGS. 3 and 4. For instance, while keyed opening 56 is illustrated in FIGS. 3 and 4 as having a substantially circular cross-section, this is not a requirement. FIGS. 6A-6C illustrate an exemplary embodiment wherein at least the cross-sectional geometry of keyed opening 94 is different from that of keyed opening 56. Accordingly, the cross-sectional geometry of the shaft of adjustment mechanism 98 will be substantially similar to that of keyed opening 94 within which it is received. Alternate embodiments of and alternatively shaped keyed openings and the shaft of the corresponding adjustment mechanisms configured for providing the described operational functionalities are considered as being within the metes and bounds of the instant invention.

While keyed openings 56 and 94 in combining plane 24 are referenced in the foregoing descriptions, it should be understood that, in some embodiments of the invention, keyed opening 54 in combining plane 22 will be substantially similar, both structurally and functionally, to keyed opening 56 and/or keyed opening 92. In alternate embodiments of the invention, while combining planes 22 and 24 are structurally and functionally similar, their respective keyed openings can be different from one another. For instance, in a non-limiting exemplary embodiment of the invention, combining plane 22 includes keyed opening 92 (see FIG. 6A) similar to keyed opening 94 as shown and described with reference to FIGS. 6A-6C while combining plane 24 includes keyed opening 56. Alternately, combining plane 22 may include keyed opening 54 while combining plane 24 includes keyed opening 94. It should be understood that cross-sectional geometry and/or the outside surface geometry of the shaft of the adjustment mechanism must substantially match the keyed opening within which it is received. In view thereof, all alternate structural and/or functional embodiments for the keyed openings in the combining planes and the shaft of the adjustment mechanisms received within those keyed openings, as may become apparent to one skilled in the art, are considered as being within the metes and bounds of the instant invention.

As disclosed and described herein above with reference to FIGS. 1-4, feedblock 10, in accordance with a non-limiting exemplary embodiment of the invention, is configured for forming a laminate having two or more layers of extrudates exiting any two of primary outlet 34 and secondary outlets 36 and 38.

A method for forming a laminate, in accordance with a non-limiting exemplary embodiment of the invention, includes providing feedblock 10 in accordance with the various embodiments of the invention, introducing a flow of an extrudate in primary inlet 14 and in a unitary or single secondary inlet or in each of the at least two secondary inlets 16 and 18, forming a laminate at the approximate location identified by reference numeral 50, and extruding the laminate through laminate outlet 20 in housing 12 of feedblock 10. As such, the method forms a laminate having a layer of the extrudate exiting primary outlet 34 juxtaposed between layers of extrudates exiting each one of secondary outlets 36 and 38.

As disclosed and described in the foregoing with reference to FIGS. 1-4, feedblock 10 is configured for effectuating the thicknesses of the extrudates exiting primary outlet 34 and each one of secondary outlets 36 and 38. Additionally, feedblock 10 is also configured for forming a three-layer or a two-layer laminate and for simply extruding a single layer of an extrudate. Accordingly, the method includes modulating the mass flow rates of the extrudates in primary flow path 40 and in each one of secondary flow paths 42 and 44 for effectuating the thicknesses of the extrudates exiting primary outlet 34 and each one of secondary outlets 36 and 38. As such, the thicknesses of each layer of extrudate forming the laminate can be modulated or set. In accordance with another embodiment of the invention, each combining plane 22 and 24 is operated in a free-floating mode responsive to the equilibrium pressures exerted on each combining plane 22 and 24 by the mass flow rates of the extrudates in primary flow path 40 and in each one of secondary flow paths 42 and 44. In accordance with yet another embodiment of the invention, the method includes steps for setting the extent (or sensitivity) of the responsiveness of combining planes 22 and 24 to the equilibrium pressures exerted thereon by the mass flow rates of the extrudates in primary flow path 40 and in each one of secondary flow paths 42 and 44. Additionally, the method includes steps for setting the thicknesses of the extrudates exiting primary outlet 34 and each one of secondary outlets 36 and 38 to pre-determined values. Accordingly, the method provides for changing, closing and/or opening one or more of primary outlet 34 and secondary outlets 36 and 38 either by setting combining planes 22 and 24 to pre-determined fixed positions or by modulating the mass flow rates of the extrudates in one or more of primary flow path 40 and secondary flow paths 42 and 44.

Various modifications and additions may be made to the exemplary embodiments described hereinabove without departing from the scope, intent and spirit of the instant invention. For example, while the disclosed embodiments refer to particular features, the scope of the instant invention is considered to also include embodiments having various combinations of features different from and/or in addition to those described hereinabove. Accordingly, the present invention embraces all such alternatives, modifications, and variations as within the scope, intent and spirit of the appended claims, including all equivalents thereof.

We claim:
1. An adjustable feedblock, comprising:
a housing having an outside wall that defines an exterior of said housing, said housing including:
a primary inlet;
one or more secondary inlets; and a laminate outlet, said housing surrounding said laminate outlet on four sides;
one or more combining planes removably disposed within said housing;
a primary outlet within said housing, said primary outlet defined, at least partially, by at least one of said one or more combining planes;
one or more extrudate distribution blocks removably disposed within said housing, each extrudate distribution block surrounded on four sides by said housing and comprising both an extrudate inlet block and an abutting block carried against said extrudate inlet block;
one or more secondary outlets within said housing, each of said one or more secondary outlets defined, at least partially, by at least one of said one or more combining planes and said abutting block of said respective extrudate distribution block of said one or more extrudate distribution blocks;
a primary flow path within said housing, said primary flow path extending between said primary inlet and said primary outlet within said housing, at least a portion of said primary flow path proximate said primary outlet being at least partially delineated by a surface of said one or more combining planes, each extrudate inlet block and each abutting block extending from said exterior wall of said housing to said primary flow path within said housing;
one or more secondary flow paths within said housing, each of said one or more secondary flow paths extending between at least one of said one or more secondary inlets and at least one of said one or more secondary outlets within said housing, at least a portion of each of said one or more secondary flow paths proximate one of said secondary outlets being delineated between at least one of said one or more combining planes and said abutting block of one of said one or more extrudate distribution blocks; and
a laminate flow path within said housing, said laminate flow path extending between said primary outlet and said laminate outlet.

2. The feedblock of claim 1, wherein said primary outlet comprises an opening located between two or more combining planes.

3. The feedblock of claim 1, wherein said one or more combining planes are individually and independently adjustable.

4. The feedblock of claim 1, wherein said one or more combining planes are configured to effectuate:
a thickness of extrudate exiting said primary outlet; and
a thickness of extrudate exiting said one or more secondary outlets.

5. The feedblock of claim 1, wherein said one or more combining planes are configured for operating in a free-floating mode responsive to an equilibrium pressure exerted on said one or more combining planes by mass flow rates of extrudates in said primary flow path and in said one or more secondary flow paths.

6. The feedblock of claim 5, wherein an extent of said responsiveness of said one or more combining planes to said equilibrium pressure is individually and independently adjustable.

7. The feedblock of claim 6, wherein said equilibrium pressure exerted on said one or more combining planes determines:
a thickness of extrudate exiting said primary outlet; and
a thickness of extrudate exiting said one or more secondary outlets.

8. The feedblock of claim 1, wherein each of said one or more combining planes is set in a pre-determined fixed position.

9. The feedblock of claim 1, wherein at least a portion of said one or more secondary flow paths within said one or more extrudate distribution blocks is divergent.

10. The feedblock of claim 6, wherein at least a portion of said one or more secondary flow paths within said one or more extrudate distribution blocks is non-linear.

11. The feedblock of claim 1, wherein at least a portion of said one or more secondary flow paths within said one or more extrudate distribution blocks is non-linear.

12. The feedblock of claim 1, comprising:
at least two secondary inlets;
at least two secondary outlets; and
at least two secondary flow paths,
each of said at least two secondary flow paths extending between one of said at least two secondary inlets and one of said at least two secondary outlets.

13. The feedblock of claim 1, wherein at least a portion of said one or more secondary flow paths includes a concave shaped flow path section formed in said one or more extrudate distribution blocks.

14. The feedblock of claim 1, wherein each of said one or more combining planes has a keyed opening and an adjustment mechanism extending through said keyed opening.

15. The feedblock of claim 1, wherein each extrudate inlet block has a flow inlet, a flow path section, and a flow outlet, said flow path section extending from said flow inlet to said flow outlet, said extrudate inlet block and said abutting block carried against each other such that a subsequent flow path section extends between said abutting block and an adjacent one of said one or more combining planes.

16. An adjustable feedblock, comprising:
a housing having an outside wall that defines an exterior of said housing, said housing including:
a primary inlet;
one or more secondary inlets; and
a laminate outlet, said housing surrounding said laminate outlet on four sides;
one or more combining planes removably disposed within said housing;
a primary outlet within said housing, said primary outlet defined, at least partially, by at least one of said one or more combining planes;
one or more extrudate distribution blocks removably disposed within said housing, each extrudate distribution block surrounded on four sides by said housing and comprising both an extrudate inlet block and an abutting block carried against said extrudate inlet block;
one or more secondary outlets within said housing, each of said one or more secondary outlets defined, at least partially, by at least one of said one or more combining planes and said abutting block of said respective extrudate distribution block of said one or more extrudate distribution blocks;
a primary flow path within said housing, said primary flow path extending between said primary inlet and said primary outlet within said housing, at least a portion of said primary flow path proximate said primary outlet is at least partially delineated by a surface of said one or more combining planes, each extrudate inlet block and each abutting block extending entirely from said exterior wall of said housing to said primary flow path within said housing;
one or more concave secondary flow paths within said housing, each of said one or more concave secondary flow paths extending between at least one of said one or more secondary inlets and at least one of said one or more secondary outlets within said housing, at least a portion of each of said concave secondary flow paths proximate one of said secondary outlets being at least partially delineated by both a concave surface of one of said one or more combining planes and a convex surface of said abutting block of one of said one or more extrudate distribution blocks; and a laminate flow path within said housing, said laminate flow path extending from said primary outlet to said laminate outlet.

17. The feedblock of claim 16, wherein each extrudate inlet block has a flow inlet, a flow path section, and a flow outlet, said flow path section extending from said flow inlet to said flow outlet, said extrudate inlet block and said abutting block carried against each other such that a subsequent flow path section extends between said abutting block and an adjacent one of said one or more combining planes.

\* \* \* \* \*